United States Patent
Matsushita et al.

(10) Patent No.: US 8,288,746 B2
(45) Date of Patent: Oct. 16, 2012

(54) LAMINATED GLASS WITH SHADE BAND

(75) Inventors: Yoshimitsu Matsushita, Tokyo (JP); Toru Maruyama, Tokyo (JP); Hideki Okamoto, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 761 days.

(21) Appl. No.: 12/091,786

(22) PCT Filed: Oct. 27, 2006

(86) PCT No.: PCT/JP2006/321557
§ 371 (c)(1),
(2), (4) Date: Jul. 16, 2009

(87) PCT Pub. No.: WO2007/049766
PCT Pub. Date: May 3, 2007

(65) Prior Publication Data
US 2009/0303581 A1 Dec. 10, 2009

(30) Foreign Application Priority Data

Oct. 28, 2005 (JP) ................. 2005-315292

(51) Int. Cl.
*G02B 5/08* (2006.01)
*G02B 5/20* (2006.01)

(52) U.S. Cl. ........................................ 250/573; 428/46

(58) Field of Classification Search .................. 250/573; 428/46–49, 201–207, 328, 436–437
See application file for complete search history.

(56) References Cited

U.S. PATENT DOCUMENTS
3,597,050 A 8/1971 Plumat
(Continued)

FOREIGN PATENT DOCUMENTS
DE 103 37 701 3/2005
(Continued)

OTHER PUBLICATIONS

Extended European Search Report, including Supplementary European Search Report and European Search Opinion, dated May 6, 2010, for Application No. 06822518.4-2124/1970356.

(Continued)

*Primary Examiner* — Seung C Sohn
(74) *Attorney, Agent, or Firm* — Antonelli, Terry, Stout & Kraus, LLP.

(57) ABSTRACT

An object of the present invention is to provide a laminated glass which reduces light transmittance loss of a certain region thereof at a predetermined wavelength, particularly within a near-IR (750 to 1,000 nm) range and which facilitates provision of an optical instrument employing the near-IR light without partial substitution of an intermediate film. The invention provides a laminated glass for vehicle formed of two glass sheets stuck with a thermoplastic resin film, wherein the laminated glass has a first region and a second region; the second region is provided in a belt-like form along upper side of the laminated glass when the laminated glass is secured onto the vehicle; the first region has a visible light transmittance of 70% or higher; the second region has a visible light transmittance of 5% to 50%; the difference, in a light transmittance within a wavelength range of 750 to 1,000 nm, between the first region and the second region is 5% or less; and the second region has a light transmittance of 25% or higher, within a wavelength range of 750 to 1,000 nm.

8 Claims, 10 Drawing Sheets

U.S. PATENT DOCUMENTS

| | | | |
|---|---|---|---|
| 4,139,652 A | 2/1979 | Postupack et al. | |
| 6,806,485 B2 * | 10/2004 | Jackson, Jr. | 250/573 |
| 2002/0039649 A1 * | 4/2002 | Nagai | 428/328 |
| 2006/0250711 A1 | 11/2006 | Noguchi et al. | |

FOREIGN PATENT DOCUMENTS

| | | |
|---|---|---|
| EP | 0 727 306 A2 | 8/1996 |
| EP | 1193048 | 4/2002 |
| EP | 1462244 | 9/2004 |
| JP | 48-31736 | 10/1973 |
| JP | 05-301993 | 11/1993 |
| JP | 08-259279 | 10/1996 |
| JP | 2002-173347 | 6/2002 |

OTHER PUBLICATIONS

LANSEXX: "MACROLEX Blau RR Gran", LANXESS Energizing Chemistry, Feb. 2005, 2 pages, Product Datasheet, XP002576982.
LANSEXX: "MACROLEX Yellow G Gran", LANXESS Energizing Chemistry, Feb. 2005, 2 pages, Product Datasheet, XP002576983.
Japanese Official Action dated Apr. 24, 2012, for JP Application No. 2007-542704.

* cited by examiner

LAMINATED GLASS WITH SHADE BAND

BACKGROUND OF THE INVENTION

1. Field of the Invention

The present invention relates to a laminated glass for vehicle and, more particularly to a laminated glass for vehicle used in conjunction with an optical instrument.

2. Background Art

In order to enhance anti-glare and heat-shielding performance, some types of laminated glass for vehicle, particularly those for a windshield, are provided with a colored (green, blue, etc.) band-form shade area (i.e., shade band). Such a shade band is generally formed through coloring a band-form area of an intermediate film for joining glass sheets. By law, a windshield provided with a shade band is required to have an area (vision area) having a visible light transmittance equal to or higher than a predetermined value (e.g., $\geqq 70\%$). Therefore, a shade band is generally formed in an upper section of a windshield, which is present outside the visible area.

In recent years, there has been proposed an intermediate film for laminated glass endowed with an IR-absorbing function for enhancing heat-shielding performance of window panes. This function is provided by dispersing particles of conductive material such as ITO (indium-doped tin oxide) in an intermediate film formed of a thermoplastic resin such as polyvinyl butyral (PVB) (see, for example, Japanese Patent Application Laid-Open (kokai) No. 8-259279).

Meanwhile, toward a recent trend for establishment of ITS (intelligent transport system) communication, a variety of instruments have come to be installed in a vehicle. Such instruments include a photoreceptor (e.g., a CCD camera), which is disposed so that light having a wavelength ranging from the visible region to the IR region is received via a glass pane, particularly via a windshield. When such an instrument is secured onto a windshield such that the instrument is in contact with the inner surface (i.e., the surface facing the interior of a vehicle) of the windshield, the instrument is preferably disposed in an upper section of the vision area of the windshield, so as to provide a sufficient vision area and to fully attain the function of the instrument.

However, as mentioned above, a shade band is often provided in an upper section of the windshield. Since the shade band considerably lowers the light transmittance within a range of visible light to IR light, the shade band reduces sensitivity of a provided photoreceptor to the light passing through the shade band.

Hitherto, in an attempt to solve the above problems, several methods have been proposed. For example, Japanese Patent Publication (kokoku) No. 48-81736 discloses a method of mitigating attenuation in transmittance through employment of an intermediate film formed of a plurality of layers not including a layer that reduces transmittance. The pamphlet of WO03/059837 discloses an approach including employing a low-transmission-loss intermediate film part instead of a part of a shade band causing high light transmission loss.

However, the method disclosed in Japanese Patent Publication (kokoku) No. 48-81736 has a drawback. Specifically, when a region of the shade band having higher visible-light transmittance is provided, the region of the intermediate film is formed in a dented shape. Thus, during the course of sticking with two glass sheets by such an intermediate film, complete degassing becomes difficult, and air bubbles remain in the space between the inner surfaces of the glass sheets. One possible approach for solving the problem is to fill, for planarization, the dented portion with a material having high transmittance. However, this approach is a cumbersome step, which is problematic. When the approach disclosed in the pamphlet of WO03/059837 is employed, a region of the intermediate film to be given higher transmittance must be substituted by a high-transmittance intermediate film part, which is also a problematically cumbersome step.

Japanese Patent Application Laid-Open (kokai) No. 2002-173347 discloses a laminated glass employing an intermediate film containing IR-shielding microparticles which provide small transmission loss in terms of infrared light having a wavelength of about 850 nm. The infrared light is employed in a system such as a VICS (vehicle information and communication system) or a key-less entry system installed in a vehicle. However, when the method disclosed in Japanese Patent Application Laid-Open (kokai) No. 2002-173347 is employed, IR-shielding microparticles contained in the intermediate film make the near-IR (750 to 1,000 nm) light transmittance poor. Thus, such a laminated glass is not preferred for a case where an optical instrument employing light having a wavelength falling within the near-IR range is provided on the inner surface of the glass pane.

In addition, a pigment employed as a colorant for producing a conventional shade lowers the near-IR (750 to 1,000 nm) light transmittance. Thus, when such a pigment is employed, near-IR light cannot completely be received, in the case where an optical instrument employing near-IR light is provided on the interior surface of the glass pane.

SUMMARY OF THE INVENTION

In view of the foregoing, an object of the present invention is to provide a laminated glass which reduces light transmittance loss of a certain region thereof at a predetermined wavelength, particularly within a near-IR (750 to 1,000 nm) range and which facilitates provision of an optical instrument employing the near-IR light without partial substitution of an intermediate film.

The present inventors have conducted extensive studies for attaining the aforementioned object, and have found that the object can be attained by a laminated glass having a first region and a second region, wherein the second region is provided in a belt-like form along upper side of the laminated glass when the laminated glass is secured onto the vehicle; the first and second regions have predetermined visible light transmittance values; the difference, in a light transmittance at a predetermined wavelength, between the first region and the second region is adjusted to a predetermined value; and the second region of the laminated glass has a predetermined light transmittance. The present invention has been accomplished on the basis of this finding.

Accordingly, the present invention provides a laminated glass for vehicle formed of two glass sheets stuck with a thermoplastic resin film, wherein the laminated glass has a first region and a second region;

the second region is provided in a belt-like form along upper side of the laminated glass when the laminated glass is secured onto the vehicle;

the first region has a visible light transmittance of 70% or higher;

the second region has a visible light transmittance of 5% to 50%;

the difference, in a light transmittance within a wavelength range of 750 to 1,000 nm, between the first region and the second region is 5% or less; and the second region has a light transmittance of 25% or higher, within a wavelength range of 750 to 1,000 nm.

Preferably, a portion of the thermoplastic resin film corresponding to the second region has a colored region.

Preferably, the colored region is colored with a dye.

Preferably, at least a portion of the thermoplastic resin film corresponding to the second region contains an UV absorber.

Preferably, the intermediate film is colored such that the coloring depth in the film thickness direction fails to reach at least the interface between the film and one of the two glass sheets, the glass sheet facing the outside of a vehicle when the laminated glass is secured onto the vehicle.

Preferably, an UV transmittance of the outer glass sheet of the two glass sheets is 50% or lower.

Preferably, an UV transmittance of the outer glass sheet of the two glass sheets is 25% or lower.

An optical instrument may be provided in conjunction with the laminated glass for vehicle such that the instrument is in contact with a surface of one of the two glass sheets in the second region, the glass sheet facing the inside of a vehicle when the laminated glass is secured onto the vehicle.

Preferably, the optical instrument is a sensor for detecting liquid droplets which are attached onto the laminated glass for vehicle, or an on-board camera.

Preferably, the on-board camera is a CCD camera.

By use of the laminated glass for vehicle, an optical instrument, particularly that employing a light beam having a wavelength falling within a near-IR (750 to 1,000 nm) range, can be installed in a vehicle, without performing a cumbersome step such as substitution of an intermediate film.

DETAILED DESCRIPTION OF PREFERRED EMBODIMENTS

The laminated glass of the present invention is formed of two glass sheets stuck with a thermoplastic resin film, and has a first region (hereinafter may be referred to as a laminated glass first region) and a second region (hereinafter may be referred to as a laminated glass second region). The second region is provided in a belt-like form along upper side of the laminated glass when the laminated glass is secured onto the vehicle. The first and second regions have predetermined visible light transmittance values. The difference, in a light transmittance with respect to light having a predetermined wavelength, between the first region and the second region is adjusted to a predetermined value. The second region of the laminated glass has a predetermined light transmittance.

An embodiment of the present invention will next be described with reference to FIGS. 1 and 2.

[Thermoplastic Resin Film (Intermediate Film)]

Figure 1:
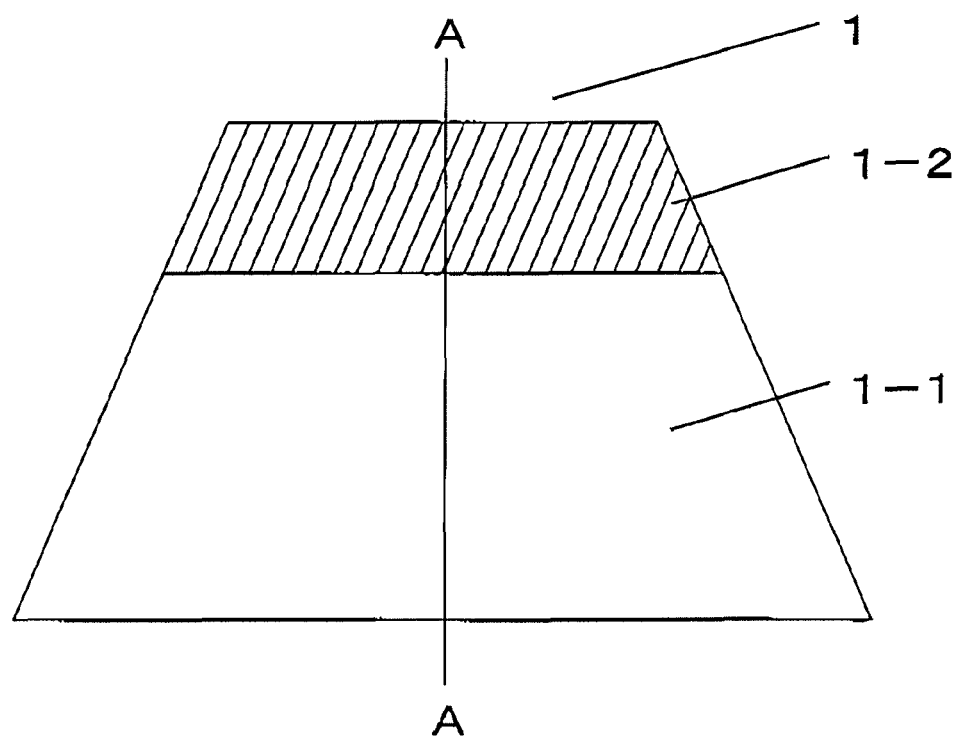
FIG. 1 is a sketch of an intermediate film employed in the present invention.

FIG. 1 is a schematic view of a thermoplastic resin film (hereinafter may be referred to as an intermediate film) employed in the present invention. FIG. 2 is a cross-section of a laminated glass including the intermediate film employed in the present invention, cut along the line A-A shown in FIG. 1.

The intermediate film 1 employed in the present invention includes an intermediate film first region 1-1 and an intermediate film second region 1-2. The intermediate film 1 is sandwiched by two glass sheets for joining together, whereby laminated glass is formed. A portion of the intermediate film corresponding to the laminated glass first region 3-1 does not include the intermediate film second region 1-2, whereas a portion of the intermediate film corresponding to the laminated glass second region 3-2 is formed of the intermediate film first region 1-1 and the intermediate film second region 1-2.

The intermediate film first region 1-1 is formed from a thermoplastic resin. From the viewpoint of high adhesion to glass sheets for forming a laminated glass, thermoplastic resins such as polyvinyl acetal and ethylene-vinyl acetate copolymer are preferably employed. Of these, polyvinyl butyral (PVB) resin is preferred as the thermoplastic resin. The intermediate film first region 1-1 is formed through, for example, kneading and molding of a thermoplastic resin composition containing the above thermoplastic resin and a conventional plasticizer. Alternatively, the intermediate film 1 may be a commercial thermoplastic resin film as it is.

The plasticizer employed in the present invention may be a common plasticizer employed for producing such an intermediate film. Examples of the plasticizer include triethylene glycol di-2-ethylbutyrate (3 GH), triethylene glycol di-2-ethylhexanoate (3GO), and triethylene glycol di-2-caprylate. These plasticizers may be used singly or in combination of two or more species.

Preferably, the thermoplastic resin composition forming the intermediate film first region 1-1 contains an UV absorber, in order to prevent discoloring of a colorant employed in the intermediate film second region 1-2 mentioned hereinbelow. The thermoplastic resin composition forming the intermediate film first region 1-1 preferably has an UV absorber content of 0.01 to 5.0 mass %. When the UV absorber content falls within the range, sufficient UV absorbing performance can be attained, thereby preventing problematic phenomena such as drop in adhesion between the intermediate film and a glass sheet. Examples of the UV absorber include benzophenone compounds, benzotriazole compounds, malonate ester compounds, oxalanilide compound, and oxalamide compounds. The UV absorber may be contained in the intermediate film second region 1-2. In this case, the UV absorber content is the same as the content in the intermediate film first region.

The intermediate film second region 1-2 is provided mainly in order to impart anti-glare property to a laminated glass and to reduce the amount of sunlight within the visible light range coming into a vehicle, and is preferably formed through coloring a material for the intermediate film first region 1-1. The intermediate film second region 1-2 has such a low visible light transmittance that the outside of the vehicle can be barely recognized visually, and cannot satisfy a level of visible light transmittance value stipulated by law. Therefore, when a laminated glass is secured onto a vehicle, the intermediate film second region (other than vision area) is provided in a belt-like form along the upper end of the laminated glass. The interface between the intermediate film second region and the intermediate film first region may be provided with gradation.

The aforementioned intermediate film second region 1-2 is preferably provided such that the laminated glass first region 3-1 has an area equal to or greater than that of the vision area.

The intermediate film second region 1-2 is preferably colored such that the laminated glass has a visible light transmittance which allows visual recognition of the outside. No particular limitation is imposed on the colorant, pigment, and dye for coloring, so long as the coloring agent does not considerably absorb light having a wavelength falling within a near-IR (750 to 1,000 nm) range. From this viewpoint, a dye is preferably used.

Examples of the pigment include organic pigments such as azo dye, phthalocyanine dye, quinacridone dye, perylene dye, dioxazine dye, anthraquino dye, and isoindolinone dye; and inorganic pigments such as oxides, hydroxides, sulfides, chromates, carbonates, silicates, arsenates, ferrocyanates, carbon, and metal powder.

Examples of the dye include azo dye, anthraquinone dye, phthalocyanine dye, quinacridone dye, perylene dye, dioxazine dye, anthraquino dye, indolinone dye, isoindolinone dye, quinonimine dye, triphenylmethane dye, thiazole dye, nitro dye, and nitroso dye. Of these, azo dye and anthraquione dye are preferably employed, since they do not virtually absorb light having a wavelength falling within a near-IR range (750 to 1,000 nm).

The intermediate film may be colored through a generally employed technique such as kneading, spraying, printing, or impregnation.

Figure 2:
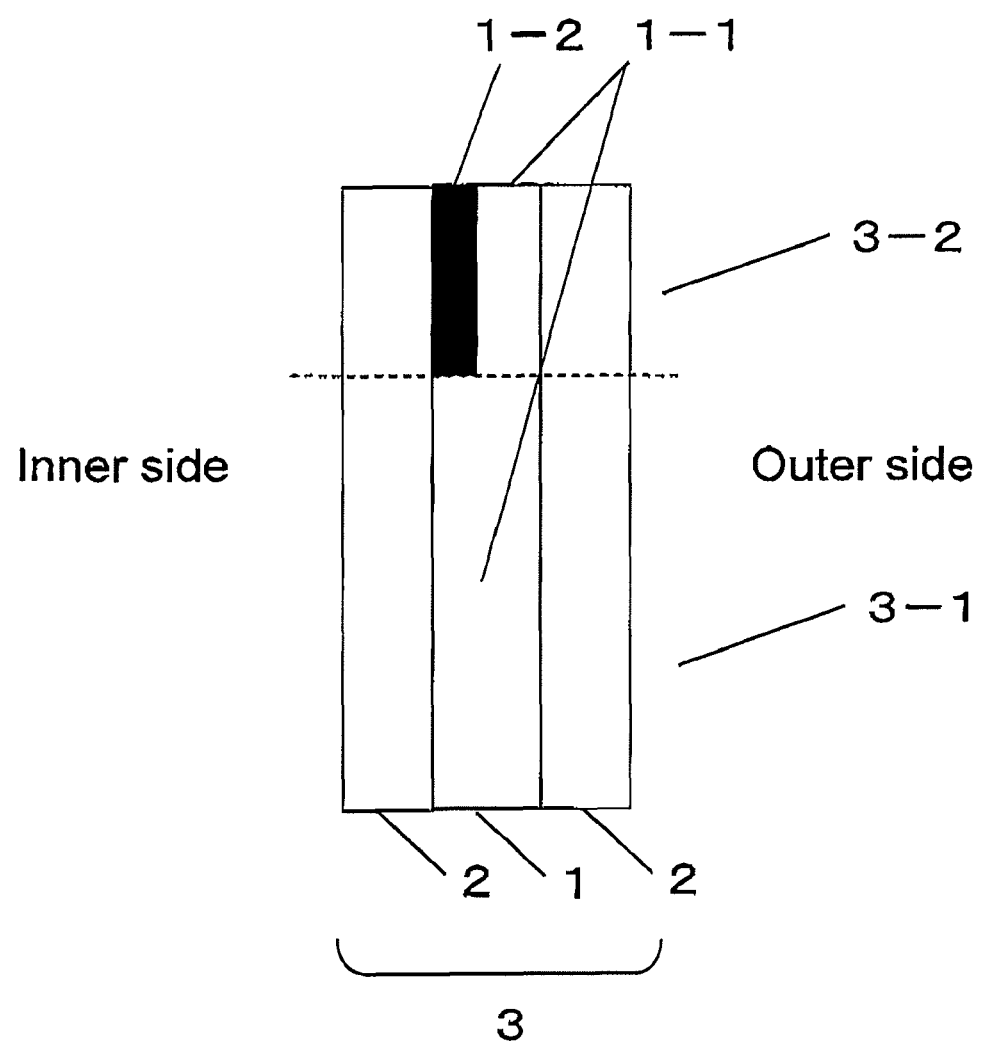
FIG. 2 is a cross-section of the laminated glass of the present invention.

As shown in FIG. 2, the intermediate film is preferably colored such that the coloring depth in the film thickness direction does not reach at least the interface between the film and the outer glass sheet. In other words, preferably, the intermediate film second region 1-2 does not extend to the interface between the film and the outer glass sheet. This preferred feature is employed for prevention of discoloring the colorant. Specifically, in addition to a UV shielding effect of the glass plates, the intermediate film absorbs UV rays by means of an UV absorber contained in at least the intermediate film first region 1-1.

The intermediate film 1 preferably has a thickness of 0.3 mm to 3 mm, more preferably 0.6 mm to 2 mm. When the thickness falls within the range, breakage of the film is prevented. Thus, when the head of an occupant of an automobile collides against the laminated glass of the invention including the intermediate film in the event of a traffic accident, possibility of injury can be minimized. In addition, material cost can be saved, since the intermediate film for laminated glass is not heavy.

The shape of the intermediate film 1 is preferably almost the same as that of a glass plate to be joined. When the intermediate film has almost the same dimensions as the glass plate, glass plates are uniformly joined by the intermediate film. In other words, joining failure of an edge portion of a glass plate caused by absence of an intermediate film portion can be prevented.

Figure 4:
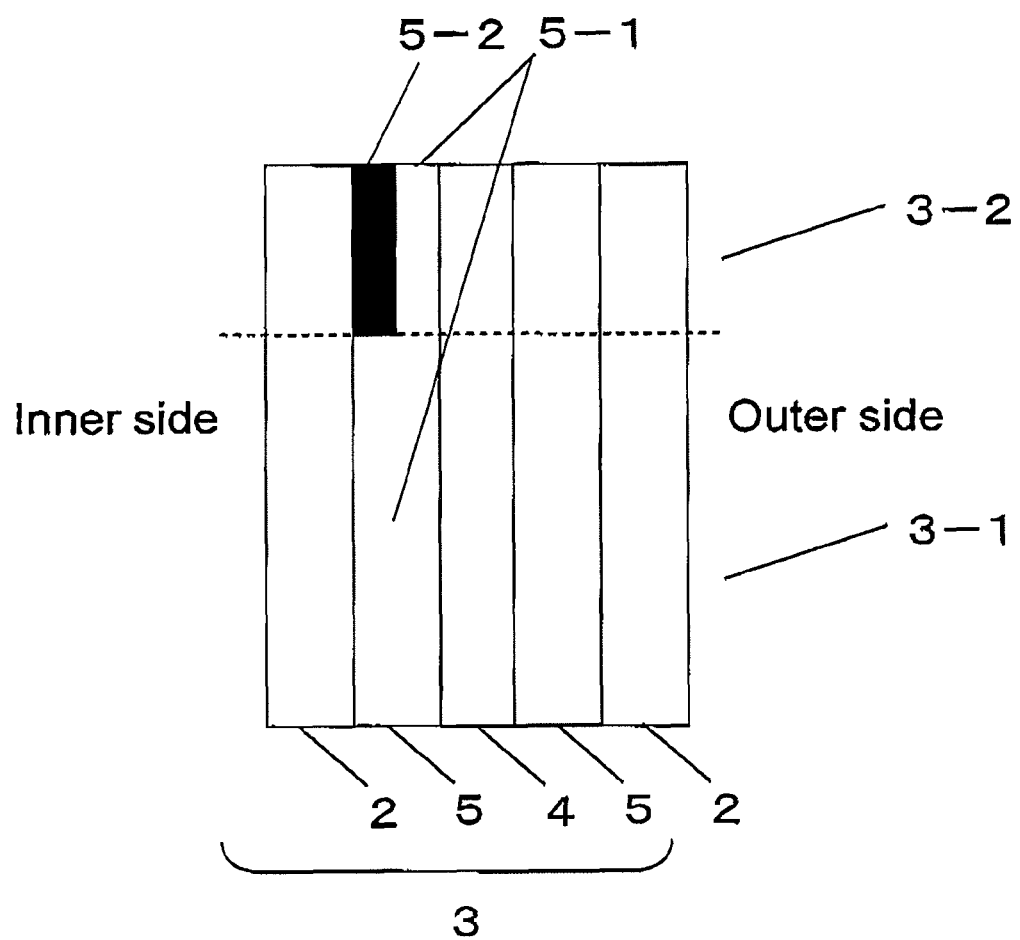
FIG. 4 is a cross-section of the laminated glass of the present invention employing an acoustic intermediate film.

In addition to the intermediate film 1 formed of the aforementioned material, an additional intermediate film having high noise insulation performance (i.e., an acoustic intermediate film) may be used in combination, to thereby impart the laminated glass with noise insulation performance. FIG. 4 shows an embodiment of such laminated glass. In FIG. 4, an acoustic intermediate film 4 is sandwiched by two normal intermediate films 5, to thereby form an intermediate film corresponding to the intermediate film 1 shown in FIG. 2.

Each intermediate film 5 is equivalent to the intermediate film 1. The acoustic intermediate film 4 may be used singly or in the form of a film laminated with a normal intermediate film 5. In the case where the acoustic intermediate film 4 is sandwiched by two normal intermediate films 5, a portion of at least one of the normal intermediate films 5 and the acoustic intermediate film 4 corresponding to the laminated glass second region 3-2 is colored, to thereby provide a normal intermediate film second region 5-2. In this case, similar to the intermediate film second region 1-2, the normal intermediate film second region 5-2 or a second region provided in the acoustic intermediate film 4 is preferably not in contact with the interface between the relevant intermediate film and the outer glass sheet. As shown in FIG. 4, a normal intermediate film first region 5-1 is generally a part except the normal intermediate region 5-2 in the normal intermediate film 5.

Such an intermediate film having high noise insulation performance may be a commercial product. Examples include S-LEC SAF (product of Sekisui Chem. Co., Ltd.) and Vanceva Quiet (product of Solutia Japan).

[Glass Sheet]

The glass sheets employed in the present invention will next be described with reference to FIG. 3.

The laminated glass 3 is formed of two glass sheets stuck with a thermoplastic resin film. No particular limitation is imposed on the material for the glass sheet employed in the laminated glass of the present invention, and soda-lime-silica glass suitable for vehicles may be employed.

No particular limitation is imposed on the soda-lime-silica glass sheet, and a clear glass sheet and various colored glass sheets may be employed. Examples of the clear or colored glass sheets include a green glass sheet, and a UV cut glass sheet, which absorbs UV rays, having a high iron content (e.g., total iron content (as reduced to $Fe_2O_3$) of preferably 0.2 mass % or higher, more preferably 0.5 mass % or higher), a high cerium content (e.g., total cerium content (as reduced to $CeO_2$) of preferably 0.05 to 1.5 mass %, more preferably 0.1 to 1.3 mass %), and a high titanium content (e.g., total titanium content (as reduced to $TiO_2$) of preferably. 0.01 to 0.5 mass %, more preferably 0.01 to 0.3 mass %).

Figure 10:
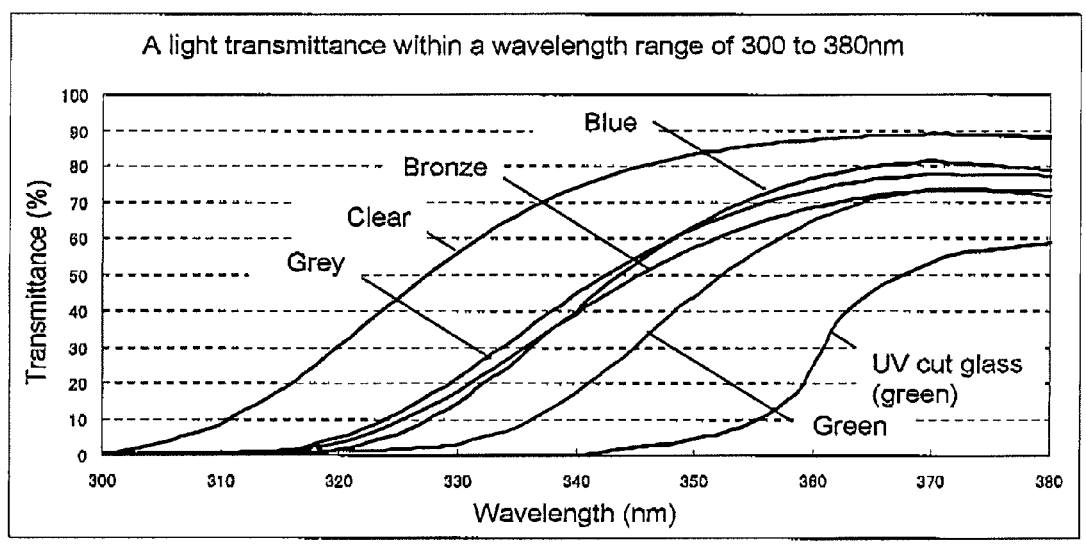
FIG. 10 is a graph showing a light transmittance within a wavelength range of 300 to 380 nm of a typical glass sheet.

In order to protect the intermediate film, particularly to prevent discoloring of a colorant, preferably employed is the aforementioned UV cut glass sheet as the outer glass sheet. The UV transmittance of the glass sheet is preferably 50% or lower, more preferably 25% or lower, even more preferably 15% or lower. FIG. 10 is a graph showing a light transmittance within a wavelength range of 300 to 380 nm of a typical glass sheet of a thickness of 2 mm. The UV transmittance of the typical glass sheet as shown in FIG. 10 was measured in accordance with the method stipulated by IS09050:2003(E), 3.6 UV transmittance. The UV transmittance of the green glass sheet and the UV cut glass sheet is each 45% and 25%, and the UV transmittance of the clear glass sheet, the gray glass sheet, the bronze glass sheet, and the blue glass sheet is each 77%, 57.7%, 53.2%, and 57.6%. The green glass sheet and the UV cut glass sheet have the UV absorption feature enough to obtain the effect of the present invention.

Through employment of such a UV absorbing glass sheet, the UV dose of the intermediate film can be drastically reduced, as compared with a clear glass or a green glass sheet, whereby discoloration of a colorant employed in the intermediate film can be prevented.

The glass sheet preferably has a thickness of 1.6 to 2.5 mm. The two glass sheets may be of identical or different thicknesses.

[Laminated Glass]

Figure 3:
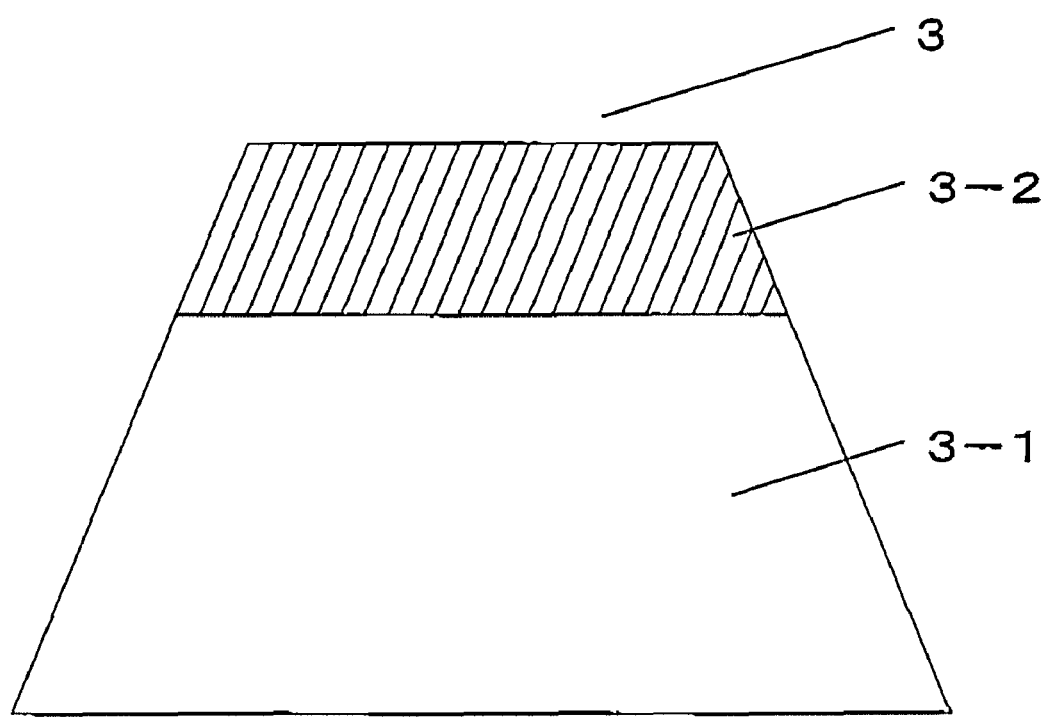
FIG. 3 is a sketch of the laminated glass of the present invention.

As shown in FIG. 3, the laminated glass includes a laminated glass first region 3-1 and a laminated glass second region 3-2, which are provided by the intermediate film first region 1-1 and the intermediate film second region 1-2.

The laminated glass first region 3-1 as a visible light transmittance of 70% or higher. The laminated glass first region has an area equal to or greater than that stipulated by law (vision area), according to the requirement for ensuring a sufficient vision field. The laminated glass second region 3-2 must have a visible light transmittance of 5% to 50% in order to impart anti-glare property to a laminated glass and to reduce the amount of sunlight within the visible light range coming into a vehicle. As used herein, the term "visible light transmittance" is a value as determined in accordance with the visible light transmittance test stipulated by JIS R3212 3.11.

The laminated glass second region 3-2 is required to have a near-IR (750 to 1,000 nm) light transmittance of 25% or higher, and the difference, in near-IR (750 to 1,000 nm) light transmittance, between the laminated glass first region 3-1 and the laminated glass second region 3-2 must be 5% or less, in order to facilitate installation of an optical instrument employing the light beam of the above wavelength. As mentioned above, the light transmittance characteristics can be realized through employment, in the laminated glass second region, of a colorant exhibiting virtually no light absorption in the near-IR region.

The near-IR (750 to 1,000 nm) light transmittance is an integral value of light transmittance over the near-IR region. The light transmittance within the entire wavelength range is preferably 25% or higher.

Similar to the aforementioned purpose, the laminated glass second region 3-2 preferably has a light transmittance within a wavelength range of 700 to 780 nm of 40% or higher, and the difference, in 700 to 780 nm light transmittance, between the laminated glass first region 3-1 and the laminated glass second region 3-2 must be 5% or less. In this case, similarly, the light transmittance is an integral value of light transmittance within the wavelength range, and the light transmittance within the entire wavelength range is preferably 40% or higher.

[Production of Laminated Glass]

The laminated glass of the present invention can be produced through any known method for producing a laminated glass. One embodiment for producing a laminated glass will now be described.

Firstly, two glass sheets are laminated by the mediation of an intermediate film, and the laminated structure is placed into a vacuum bag. The bag is degassed through evacuation for about 20 minutes to about 20 Torr, and the structure is heated at 80 to 110° C. for about 30 minutes under the evacuated condition, to thereby perform preliminary adhesion. Subsequently, the thus-produced preliminary stuck structure is removed from the bag and placed into an autoclave, where the structure is heated at 110 to 140° C. for about 30 minutes at 10 to 14 kg/cm$^2$, to thereby form a complete laminated glass.

The thus-produced laminated glass is suitable for installing in a vehicle a variety of optical instruments such as a CCD camera, an IR sensor, a VICS, an ETC, a television antenna, a radio antenna, an optical instrument employing near-IR (750 to 1,000 nm) light, an optical instrument employing near-IR (700 to 780 nm) light (e.g., a liquid droplet detection sensor), and an on-board camera. Further, in recent years the growing awareness of traffic safety, in particular the CCD camera has been actively developed, which is equipped in vehicle for obstacle detection of forward-backward of vehicle, and the road-departure warning system. The laminated glass is preferably applied to the CCD camera, which is used in the range of visible light to near-IR.

In the case where an optical instrument is installed on the laminated glass of the present invention, substitution of the intermediate film is required. As disclosed in Japanese Patent Application Laid-Open (kokai) No. 11-37952, the instrument may be installed on the inner surface of laminated glass in a vehicle by means of an adhesive (adhesive tape) etc.

EXAMPLES

Example 1

A belt-like region of a rectangular piece of intermediate film (thickness: 0.76 mm) (Saflex, product of Solutia Japan) along a longer side was colored green by use of a dye. The thus-colored piece was employed as an intermediate film for laminated glass.

Two rectangular green glass sheets (thickness: 2.1 mm) were stuck together with the mediation of the above-produced intermediate film for laminated glass. Sticking of the two glass sheets by use of the intermediate film was performed through the aforementioned conventional technique.

Figure 5:
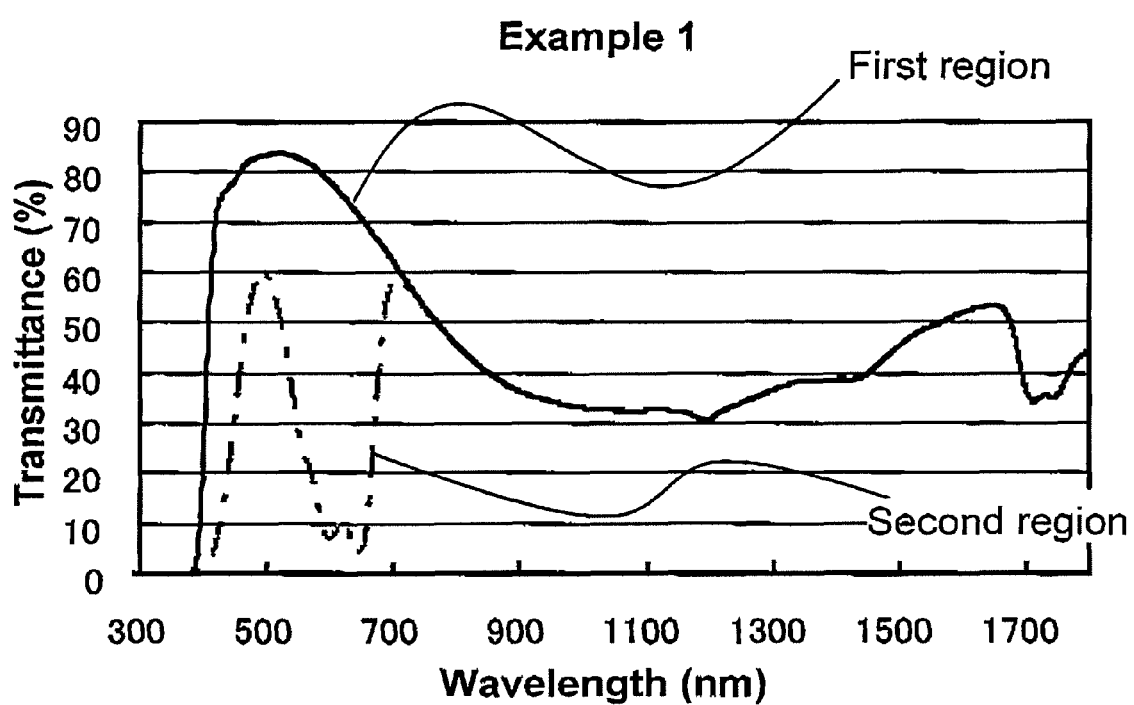
FIG. 5 is a graph showing a light transmittance of a laminated glass produced in Example 1.

The light transmittance of the thus-produced laminated glass (first and second regions) was measured by means of a spectrophotometer UV 3100 PC (Shimadzu Corporation) over a wavelength range of 300 to 1,800 nm. FIG. 1 shows the results. Furthermore, visible light transmittance and light transmittance with respect to light beams (wavelengths: 700, 750, 875, and 1,000 nm) were also measured. The results are shown in FIG. 5 and Table 1.

Example 2

The procedure of Example 1 was repeated, except that clear glass sheets were used instead of the green glass sheets employed in Example 1, to thereby produce a laminated glass.

Figure 6:
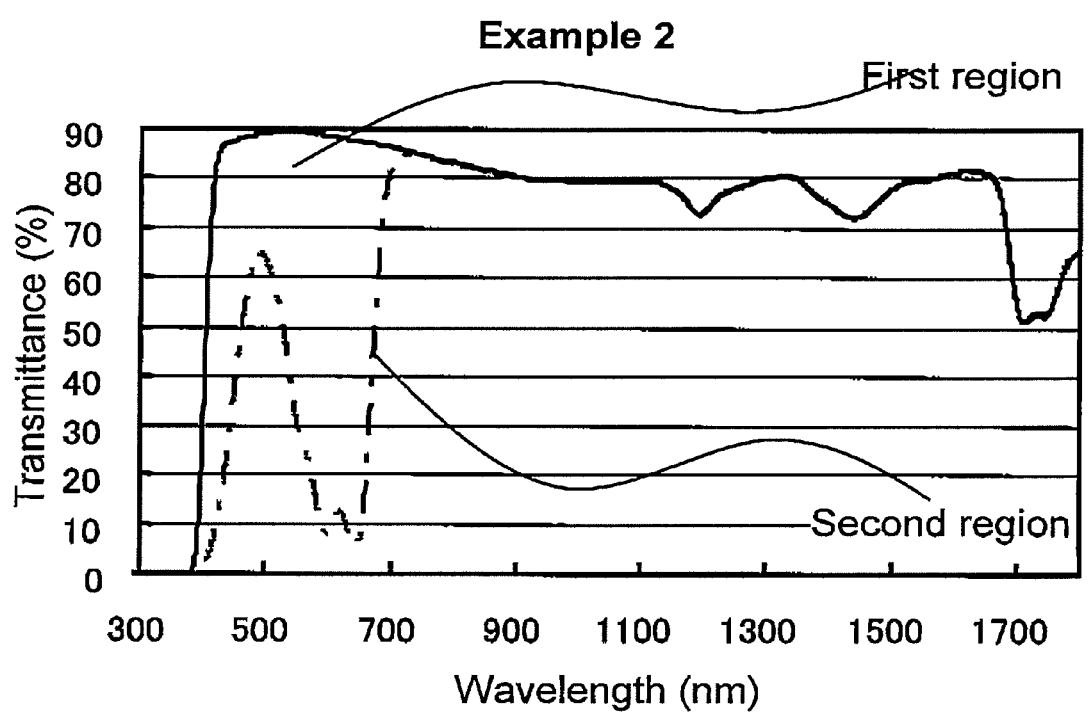
FIG. 6 is a graph showing a light transmittance of a laminated glass produced in Example 2.

The measurement was performed in a manner similar to that of Example 1, and the results are shown in FIG. 6 and Table 1.

Example 3

The procedure of Example 1 was repeated, except that the thickness of the green glass sheets was changed from 2.1 mm to 2.3 mm, and an intermediate film (S-LEC, product of Sekisui Chem. Co., Ltd.) was colored by a dye to form a blue band, to thereby produce a laminated glass.

Figure 7:
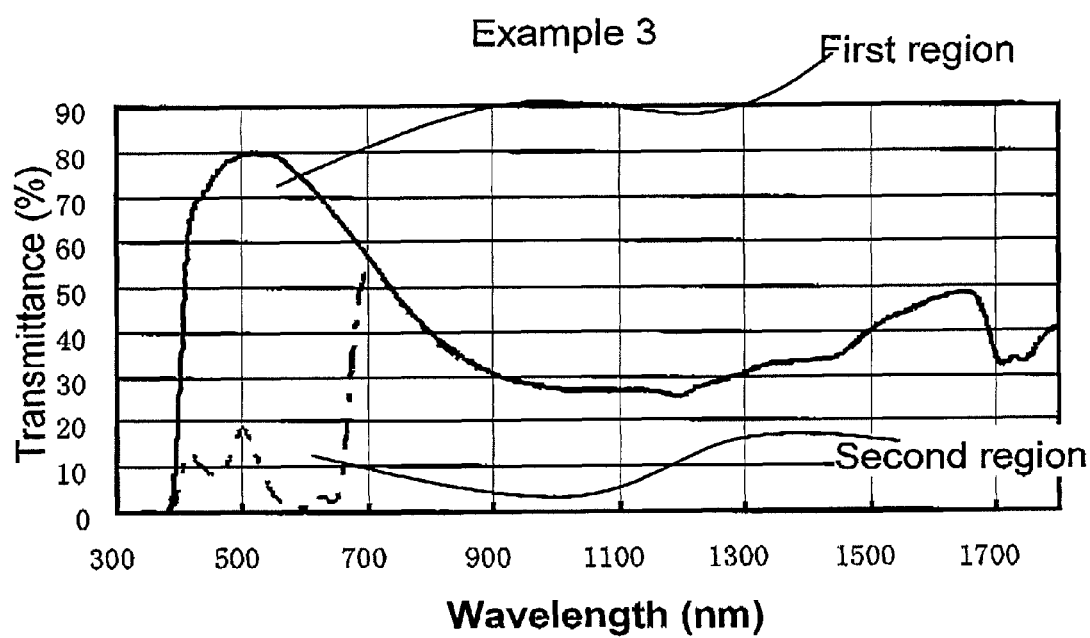
FIG. 7 is a graph showing a light transmittance of a laminated glass produced in Example 3.

The measurement was performed in a manner similar to that of Example 1, and the results are shown in FIG. 7 and Table 1.

Comparative Example 1

A dispersion of ITO microparticles (particle size: 0.02 µm or less) in 3 GH (triethylene glycol bis(2-ethylbutyrate)) (10 g, ITO microparticles content: 10% by mass), 3 GH (130 g), and PVB (polyvinyl butyral) resin (360 g) were provided. The ITO/3 GH dispersion and 3 GH were added to the PVB resin, and the mixture was kneaded by means of a three-roll mill at about 70° C. for about 15 minutes, to thereby prepare a resin material. The resin material was molded by means of an extruder at about 190° C., to thereby form a film product having a thickness of about 0.3 mm. The film product was coiled up (film (a)).

Separately, film (b) having a thickness of 0.3 mm and formed of a PVB resin (containing an azo dye but no ITO particles) was provided. Each of films (a) and (b) was cut to form a rectangular piece (15 cm×30 cm). The two pieces were placed such that one longer side of each piece is tangent to one longer side of the other piece. The thus-placed film pieces were sandwiched by two pieces (30 cm×30 cm) of film (a), to thereby form an intermediate film having a thickness of 0.9 mm.

The thus-obtained intermediate film was sandwiched by two green float glass sheets (thickness; 2.0 mm), and the structure was laminated through the same method as employed in Example 1, to thereby produce a laminated glass.

Figure 8:
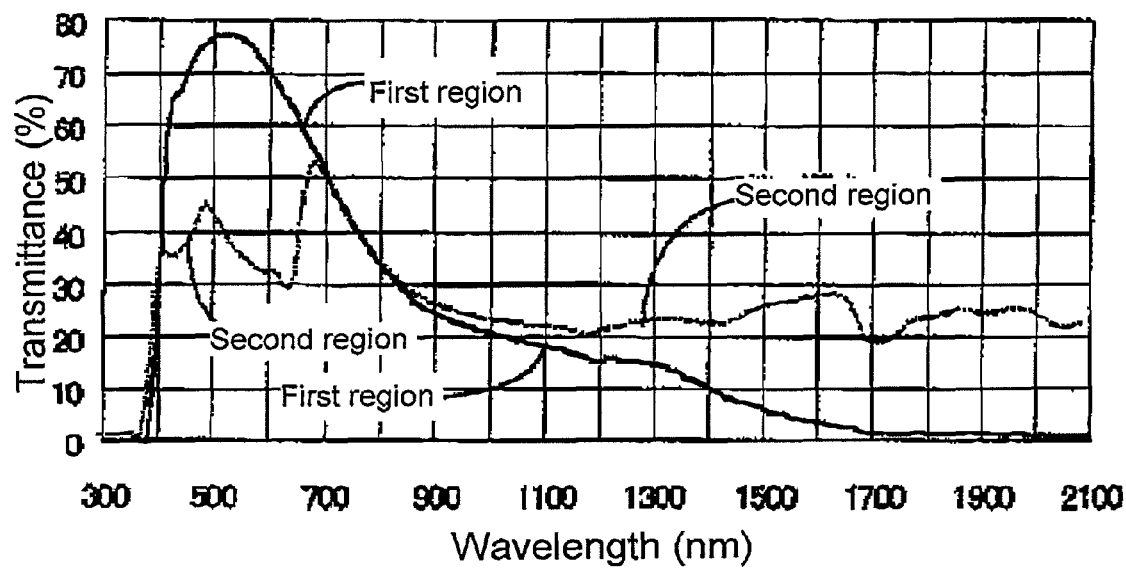
FIG. 8 is a graph showing a light transmittance of a laminated glass produced in Comparative Example 1.

Optical properties of the laminated glass were determined in a manner similar to that employed in Example 1. The results are shown in FIG. 8 and Table 1.

Comparative Example 2

The procedure of Example 1 was repeated, except that a commercial shaded intermediate film (S-LEC, product of Sekisui Chem, Co., Ltd.) was employed, to thereby produce a laminated glass.

Figure 9:
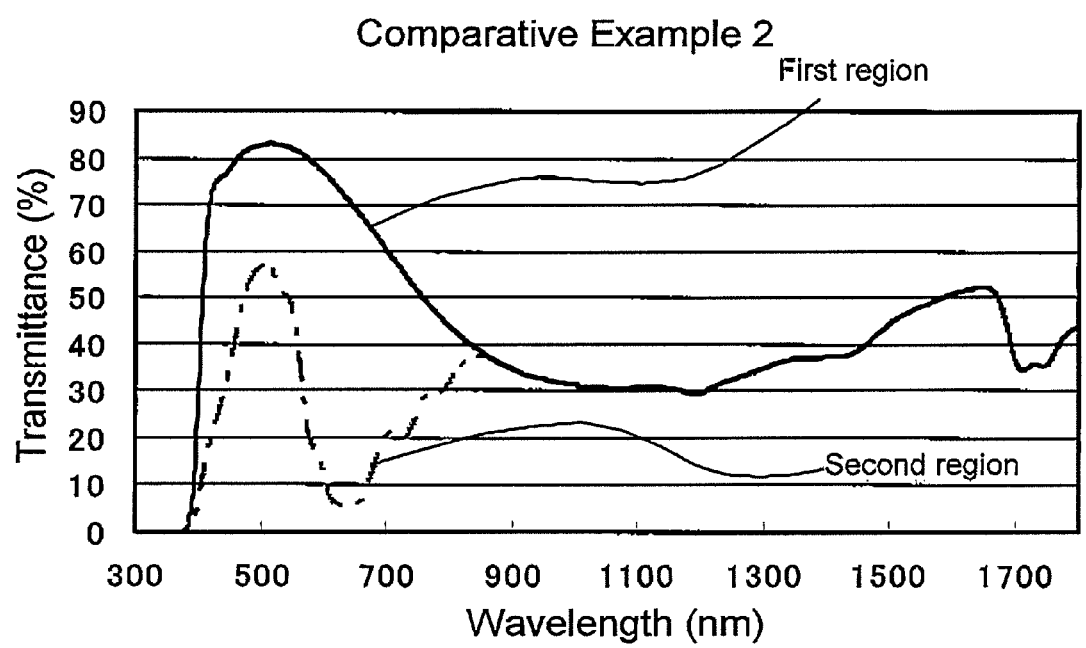
FIG. 9 is a graph showing a light transmittance of a laminated glass produced in Comparative Example 2.

Optical properties of the laminated glass were determined in a manner similar to that employed in Example 1. The results are shown in FIG. 9 and Table 1.

TABLE 1

|  | Visible light transmittance (%) | 700 nm transmittance (%) | 750 nm transmittance (%) | 780 nm transmittance (%) | 875 nm transmittance (%) | 1,000 nm transmittance (%) |
| --- | --- | --- | --- | --- | --- | --- |
| Ex. 1 | | | | | | |
| 1st region | 80.0 | 61.9 | 53.0 | 48.3 | 38.1 | 33.1 |
| 2nd region | 23.6 | 58.5 | 52.9 | 48.2 | 38.1 | 33.1 |
| Ex. 2 | | | | | | |
| 1st region | 88.9 | 86.5 | 84.7 | 83.7 | 81.1 | 79.3 |
| 2nd region | 26.3 | 81.9 | 84.5 | 83.6 | 81.1 | 79.4 |
| Ex. 3 | | | | | | |
| 1st region | 75.7 | 57.1 | 47.5 | 42.6 | 32.5 | 27.3 |
| 2nd region | 7.0 | 53.7 | 47.2 | 42.5 | 32.0 | 27.2 |
| Comp. Ex. 1 | | | | | | |
| 1st region | 74.0 | 51.0 | 41.5 | 35.0 | 27.5 | 23.0 |
| 2nd region | 36.0 | 51.0 | 41.5 | 35.0 | 26.0 | 20.5 |
| Comp. Ex. 2 | | | | | | |
| 1st region | 78.9 | 60.3 | 51.3 | 46.5 | 36.3 | 31.2 |
| 2nd region | 22.3 | 20.8 | 25.8 | 29.4 | 36.3 | 31.2 |

As is clear from FIGS. and Table 1, in a near-IR (750 to 1,000 nm) wavelength region, the transmittance of the first region and that of the second region are almost equivalent (difference therebetween of less than 1%), indicating that the colorant does not virtually intercept light within the above wavelength range. The laminated glass samples of the Examples have a light transmittance of 25% or higher, within a near-IR (750 to 1,000 nm) wavelength range. By virtue of sufficient light transmittance within the above wavelength range, the laminated glass of the present invention is suitable for installation of an optical instrument employing the light.

The present invention is able to provide a laminated glass which reduces light transmittance loss of a certain region thereof at a predetermined wavelength, particularly within a near-IR (750 to 1,000 nm) range and which facilitates provision of an optical instrument employing the near-IR light without partial substitution of an intermediate film.

What is claimed is:

1. A laminated glass for vehicle formed of two glass sheets stuck with a thermoplastic resin film which is provided as an intermediate film between the two glass sheets, wherein
    the laminated glass has a first region and a second region;
    the second region is provided in a belt-like form along upper side of the laminated glass when the laminated glass is secured onto the vehicle;
    the first region has a visible light transmittance of 70% or higher;
    the second region has a visible light transmittance of 5% to 50%;
    the difference, in a light transmittance within a wavelength range of 750 to 1,000 nm, between the first region and the second region is 5% or less; and
    the second region has a light transmittance of 25% or higher, within a wavelength range of 750 to 1,000 nm, wherein a portion of the thermoplastic resin film corresponding to the second region has a colored region, and
    wherein the intermediate film is colored such that the coloring depth in the film thickness direction fails to reach at least the interface between the intermediate film and one of the two glass sheets, the one of the two glass sheets facing the outside of the vehicle when the laminated glass is secured onto the vehicle.

2. A laminated glass for vehicle as described in claim 1, wherein the colored region is colored with a dye.

3. A laminated glass for vehicle as described in claim 1, wherein at least a portion of the thermoplastic resin film corresponding to the second region contains an UV absorber.

4. A laminated glass for vehicle as described in claim 1, wherein an UV transmittance of the outer glass sheet of the two glass sheets is 50% or lower.

5. A laminated glass for vehicle as described in claim 1, wherein an UV transmittance of the outer glass sheet of the two glass sheets is 25% or lower.

6. A laminated glass for vehicle as described in claim 1, which is further provided with an optical instrument such that the instrument is in contact with a surface of one of the two glass sheets in the second region, the one of the two glass sheets facing the inside of the vehicle when the laminated glass is secured onto the vehicle.

7. A laminated glass for vehicle as described in claim 6, wherein the optical instrument is a sensor for detecting liquid droplets which are attached onto the laminated glass for vehicle, or an on-board camera.

8. A laminated glass for vehicle as described in claim 7, wherein the on-board camera is a CCD camera.

* * * * *